March 28, 1967 W. CULL 3,310,960
UNIVERSAL JOINTS
Filed Oct. 2, 1964

INVENTOR
WILLIAM CULL
BY
Irwin S. Thompson
ATTORNEY

_United States Patent Office_

3,310,960
Patented Mar. 28, 1967

3,310,960
UNIVERSAL JOINTS
William Cull, Hest Bank, near Lancaster, England, assignor to Birfield Engineering Limited, London, England
Filed Oct. 2, 1964, Ser. No. 401,181
Claims priority, application Great Britain, Oct. 3, 1963, 38,905/63
8 Claims. (Cl. 64—21)

This invention relates to torque transmitting universal joints of the type including inner and outer members between which torque is transmitted through rolling elements such as balls located in grooves forming ball tracks in the inner and outer members.

One of the great advantages of this type of universal joint is that it can be designed to have "constant velocity" characteristics; in other words if the input member is rotating at constant velocity the output member will also rotate at constant velocity. To obtain this effect means are provided, or the joint is designed, to ensure that the rolling elements always lie in a plane passing through the centre of the joint and bisecting the angle between the axes of the inner and outer members of the joint.

A disadvantage of this type of joint is that it is difficult to obtain large angles of articulation and it is an object of the present invention to provide an improved universal joint of this general type which will provide increased angles of articulation.

The invention consists broadly in a torque transmitting universal joint comprising two component universal joints, each of the type in which torque is transmitted from an inner member to an outer member through rolling elements such as balls located in cooperating tracks formed in the inner and outer members, the two component joints being substantially concentric with one another, and including means for controlling the articulation of one component joint in dependence upon the articulation of the other component joint, the arrangement being such that one of the component joints is restrained from articulation until the other component joint has articulated through a predetermined angle.

The controlling means may comprise a spring-loaded plunger one end of which bears against a part-spherical cup member associated with the component joint to be controlled to centralise and restrain articulation of said joint until the action of the plunger is overcome. Preferably said one end of the plunger is in the form of a cam to provide a substantially constant pressure angle between said end and a part-spherical shell member associated with the component joint to be controlled. Advantageously said pressure angle is 30°.

Alternatively the controlling means may comprise a spring-loaded toggle member which may be in the form of a first ball-headed stud the other end of which is received in a bore of a member having a part-spherical external surface, and a second ball-headed stud the head of which is received in said bore and the other end of which is connected to a spring. The first stud may be screwed into said bore and may have a part-spherical end face for engagement with the ball head of the second stud. The spring connected to the second stud may be a coiled tension spring and the bore of said member may be countersunk to retain therein the ball head of the second stud.

According to a preferred feature of the invention the joint includes an intermediate member which acts as the outer member of one component joint, and as the inner member of the other component joint.

In a preferred construction the joint includes a part-spherical cup member attached to the outer member of the outer component joint, and a part-spherical shell attached to the intermediate member, the shell being located against axial movement between the said cup member and the outer member.

According to another preferred feature of the invention the outer component joint is arranged to have a more limited range of articulation than the inner component joint.

Two specific embodiments of the invention will now be described by way of example with reference to the accompanying drawings, in which.

In both embodiments the joint is designed particularly to serve as a torque transmitting component in the front wheel drive of a motor vehicle, in which application constant velocity characteristics are important and also the ability to articulate through angles in excess of 40°.

Figure 1:
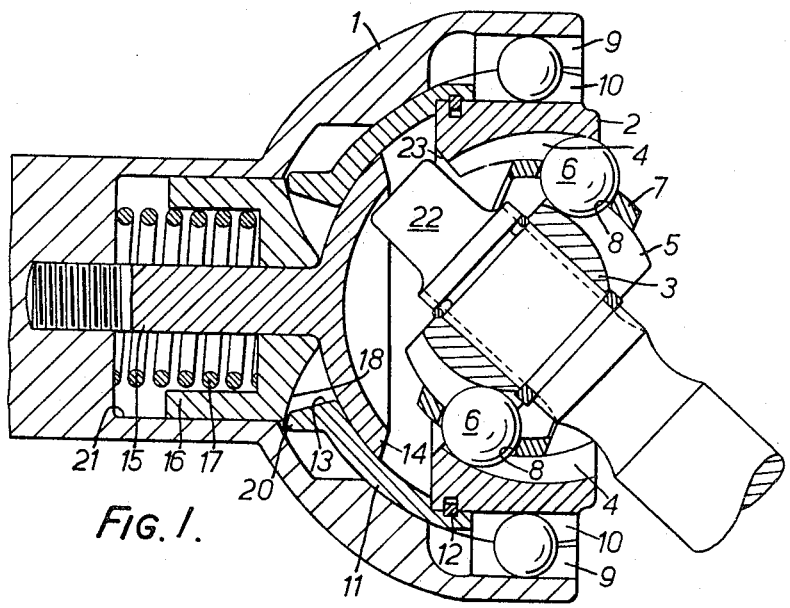
FIGURE 1 is a side view in axial section of one embodiment.
Figure 2:
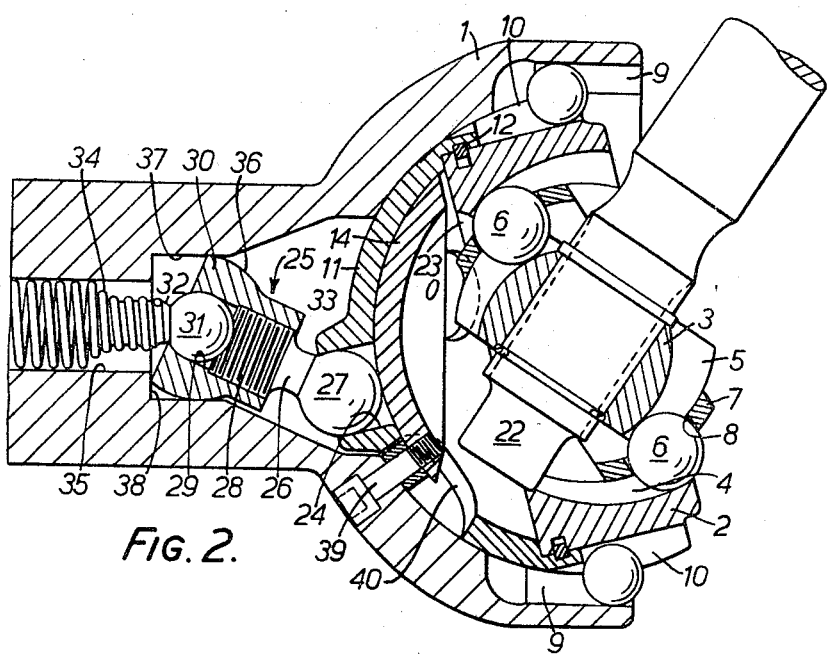
FIGURE 2 is a similar view of the other embodiment.

Referring to FIGURE 1, the joint comprises an outer bell member 1, a part-spherical intermediate member 2 which combines with the bell 1 to form the outer joint and an inner part-spherical member 3 which combines with the intermediate member 2 to form the inner joint. The intermediate member 2 and the inner member 3 are each formed with six meridian tracks 4 and 5 respectively. Each track is of semi-elliptical cross-section so as to provide localised contact areas with balls 6 positioned one in each pair of aligned tracks 4 and 5. Thus the root of each track 4 and 5 is out of ball contact. The centre of curvature of each track 4 and 5, as seen in cross-sections containing the axes of the two members 2 and 3, is displaced axially from the centre of the joint so that the track flank contact lines of a pair of inner and outer tracks 4 and 5 converge, when the drive elements of the joint are aligned, at an angle which is greater than twice the angle of friction between the balls and tracks. This arrangement ensures that the balls 6 will automatically adopt positions on a critical plane through the centre of the inner joint and bisecting the angle between the axes of the inner member 3 and the intermediate member 2, the latter constituting an outer member for the inner joint. The balls 6 are located by a part-spherical cage 7 which is a close fit between the adjacent spherical surfaces of the inner and outer members 3 and 2 of the inner joint, and which has six spaced windows 8 to locate the balls 6 axially.

The intermediate member 2, which serves as the outer member of the inner joint described above, also serves as the inner member of the outer joint. In this embodiment the outer joint is designed to have only a limited angle of articulation and it can therefore be constructed more simply and economically than the inner joint. The outer bell member 1 and the exterior of the intermediate member 2 are therefore formed with straight tracks 9 and 10 respectively, having centre lines lying approximately on an imaginary cylinder. The centre lines of the tracks 9 in the outer bell member 1 are inclined at an angle to those of the intermediate member 2 so that they cross at the median plane through the joint. To reduce the radial thickness of the intermediate member 2 and thus the overall diameter of the joint, the outer tracks 10 on the intermediate member are staggered circumferentially in relation to the inner tracks 4 on the same member associated with the inner joint. Also to counteract end loading, alternate tracks 9 are "handed" in opposite directions.

Means are provided for controlling the movement of the intermediate member 2. The means comprise a part-spherical shell 11 attached by a spring locking ring 12 to the intermediate member and extending inwards towards the base of the outer bell member 1, and is formed with a central aperture 13. A part-spherical cup 14 is arranged to bear against the inner surface of the part-spherical shell 11 and this cup is rigidly secured to a stalk 15 which passes through the aperture 13 in the shell and screws into the bell member 1. Surrounding the stalk 15 is a plunger 16 loaded by a compression spring 17 and having an end face 18 which is suitably profiled with a central projection 19 to engage an annular lip 20 surrounding the aperture 13 in the shell 11 so as to tend to centralise the shell co-axially with the bell member 1. Also the face 18 of the plunger 16 acts as a cam to give a constant pressure angle of about 30°. The compression spring 17 acts between plunger 16 and the base of a recess 21 in the bell 1 in which it lies. The arrangement is such that normally the shell 11 and therefore the intermediate member 2 are centralised relative to the outer bell member 1 but when the inner joint reaches a predetermined articulated angle the centralising force is overcome and the outer joint also articulates.

The centralising force is overcome by the output shaft 22 of the whole joint which is attached to the inner member 3 of the inner joint and is arranged to come into contact with an edge 23 of the intermediate member 2 at a predetermined limiting angle of articulation so that thereafter the outer joint will articulate. Thus the overall articulation angle is increased, up to as much as 60°.

In the second embodiment the construction of the two component inner and outer universal joints is substantially identical but alternative means are provided for locating and controlling the movement of the intermediate member 2. In this embodiment the part-spherical shell 11 attached to the intermediate member 2 has a small central aperture 24 to receive one end of a spring-controlled toggle member indicated generally at 25. The toggle member 25 comprises a stud 26 having a ball head 27 and formed with screw threads 28 at the opposite end. The ball head 27 is received in the aperture 24 in the shell 11 and the screw threads 28 are received in a countersunk bore 29 of a member 30, part of the bore being screw threaded. The remainder of the bore 29 receives a ball head 31 of a further stud 32, the ball head engaging a part spherical surface 33 at the screw threaded end of the stud 26. The other end of the further stud 32 is helically grooved to receive one end of a coiled tension spring 34, the other end of which is located against the end of a recess 35 in the outer bell member 1. The member 30 has an external part-spherical surface 36 which is arranged for sliding and articulation in a socket 37 formed in the outer bell member 1. The arrangement again is such that the spring 34 tends to centralise the shell 11: any movement of the shell 11 away from its central position rocks the toggle member 25 and causes slight elongation of the spring 34 which resists this movement. This is caused by pivoting movement of the toggle member about a contact point between the inner end of the member 30 and the flat end face 38 of the socket 37 in which it lies. Also the inner joint articulates to its limiting position before the shaft 22 engages the edge 23 of the intermediate member 2 to articulate the outer joint.

Since the toggle member 25 occupies a central position in this embodiment, the part-spherical cup 14 which locates the shell 11 is attached by three retaining screws 39 spaced about the central axis passing through apertures 40 in the shell which are of sufficient size to allow for the necessary articulating movements of the shell.

I claim:

1. A torque-transmitting joint comprising a bell-shaped outer joint member with an internal part-spherical surface formed with ball tracks, an intermediate joint member with internal and external part-spherical surfaces each of which is formed with ball tracks, an inner joint member with an external part-spherical surface formed with ball tracks, said joint members being arranged concentrically for relative articulation one within the other, a series of torque-transmitting balls engaging the ball tracks of the outer member and the external ball tracks of the intermediate member to provide an outer component universal joint, a further series of torque-transmitting balls engaging the ball tracks of the inner member and the internal ball tracks of the intermediate member to provide another component universal joint, a part-spherical shell member attached to the inner side of the intermediate member remote from the open bell mouth of the outer joint member, a part-spherical cup member fixed in the outer joint member within the shell member, the shell member having a part-spherical inner surface which slides on an outer part-spherical surface of the cup member, and a spring-loaded member mounted in the outer joint member on the inner side of the shell member, the spring-loaded member engaging the shell member to urge the latter to a central non-articulated position within the outer joint member whereby to restrain the outer component universal joint from articulation until the inner component universal joint has articulated to its maximum angle.

2. A joint according to claim 1, wherein said spring-loaded member is a plunger engaging around the periphery of a central aperture in the shell member, and the outer joint member has an axial bore in which the plunger is slidably mounted.

3. A joint according to claim 1, wherein said spring-loaded member is one element of a toggle arrangement.

4. A torque-transmitting joint comprising a bell-shaped outer joint member with an internal part-spherical surface formed with straight ball tracks, an intermediate joint member with an internal part-spherical surface formed with meridian ball tracks and an external part-spherical surface formed with straight ball tracks which cross the tracks in the outer member, an inner joint member with an external part-spherical surface formed with meridian ball tracks which are convergent with respect to the meridian tracks of the intermediate member, said joint members being arranged concentrically for relative articulation one within the other, a series of torque-transmitting balls engaging the straight ball tracks of the outer member and the straight ball tracks of the intermediate member to provide an outer component universal joint, a further series of torque-transmitting balls engaging the meridian ball tracks of the inner member and the meridian ball tracks of the intermediate member to provide another component universal joint, a part-spherical ball cage between said inner and intermediate joint members for said further series of balls, a part-spherical shell member attached to the inner side of the intermediate member remote from the open bell mouth of the outer joint member, a part-spherical cup member fixed in the outer joint member within the shell member which has a part-spherical inner surface which slides on a part-spherical outer surface of the cup member, and a spring-loaded member mounted in the outer joint member on the inner side of the shell member, the spring-loaded member engaging the shell member to urge the latter to a central non-articulated position within the outer joint member whereby to restrain the outer component universal joint from articulation until the inner component universal joint has articulated to its maximum angle.

5. A torque-transmitting joint comprising a bell-shaped outer joint member with an internal part-spherical surface formed with ball tracks, an intermediate joint member with internal and external part-spherical surfaces each of which is formed with ball tracks, an inner joint member with an external part-spherical surface formed with ball tracks, said joint members being arranged concentrically for relative articulation one within the other, a series of torque-transmitting balls engaging the ball tracks of the outer joint and the external ball tracks of the intermediate member to provide an outer component universal joint, a further series of torque-transmitting balls engaging the ball tracks of the inner member and the internal ball tracks of the intermediate member to provide another component universal joint, a shaft member fixed to the inner joint member with an inner end portion of the shaft formed for engagement with the intermediate joint member to limit articulation of the inner component joint and define the maximum angle thereof, a part-spherical shell member attached to the inner side of the intermediate member remote from the open bell mouth of the outer joint member and formed with a central aperture, a part-spherical cup member disposed concentrically within the shell member, the cup member having a stalk which passes through said aperture and is fixed in the outer joint member, the cup member having a part-spherical outer surface on which a part-spherical inner surface of the shell member slides, a spring-loaded plunger surrounding said stalk and slidable in the outer joint member into engagement with said shell member around said aperture whereby to urge the shell member and hence the intermediate joint member to a central non-articulated position, whereby the outer component universal joint is restrained from articulation until the inner component universal joint has articulated through said maximum angle.

6. A joint according to claim 5, wherein said plunger has an end surface with a cam profile which engages a rim of the shell member surrounding said aperture, such engagement providing a substantially constant pressure angle.

7. A torque-transmitting joint comprising a bell-shaped outer joint member with an internal part-spherical surface formed with ball tracks, an intermediate joint member with internal and external part-spherical surfaces each of which is formed with ball tracks, an inner joint member with an external part-spherical surface formed with ball tracks, said joint members being arranged concentrically for relative articulation one within the other, a series of torque-transmitting balls engaging the ball tracks of the outer joint and the external ball tracks of the intermediate member to provide an outer component universal joint, a further series of torque-transmitting balls engaging the ball tracks of the inner member and the internal ball tracks of the intermediate member to provide another component universal joint, a shaft member fixed to the inner joint member with an inner end of the shaft formed for engagement with the intermediate joint member to limit articulation of the inner component joint and define the maximum angle thereof, a part-spherical shell member attached to the inner side of the intermediate member remote from the open bell mouth of the outer joint member and formed with a central aperture, a part-spherical cup member fixed in the outer joint member concentrically within the shell member, the shell member having a part-spherical inner surface which slides on a part-spherical outer surface of the cup member, fixing means for the cup member passing through further clearance apertures in the shell member, and a toggle arrangement which acts to restrain the outer component joint from articulation until the inner component joint has articulated to said maximum angle, the toggle arrangement comprising a member with a ball end which engages in said central aperture of the shell member and at the other end has a part-spherical external surface which is rockable and slidable in a bore in the outer joint member, and a ball headed stud the head of which engages a bore in said other end of the toggle member and which has a shank connected to a spring urging the ball-headed stud towards the centre of the joint.

8. A joint according to claim 7, wherein the ball end of the toggle member engaging the shell member is provided by a headed stud screw threaded into a member formed with said part-spherical surface which is slidable in said bore in the outer joint member.

References Cited by the Examiner
UNITED STATES PATENTS

| 2,010,899 | 8/1935 | Rzeppa | 64—21 |
| 2,128,088 | 8/1938 | Hanft | 64—21 |
| 2,182,455 | 12/1939 | Smith | 64—7 |
| 2,352,776 | 7/1944 | Dodge | 64—21 |

FRED C. MATTERN, JR., *Primary Examiner.*

HALL C. COE, *Examiner.*